United States Patent
Carlson et al.

(10) Patent No.: US 7,035,889 B1
(45) Date of Patent: Apr. 25, 2006

(54) METHOD AND APPARATUS FOR MONTGOMERY MULTIPLICATION

(75) Inventors: David A. Carlson, Haslet, TX (US); Vishnu V. Yalala, Shrewsbury, MA (US)

(73) Assignee: Cavium Networks, Inc., Mountain View, CA (US)

( * ) Notice: Subject to any disclaimer, the term of this patent is extended or adjusted under 35 U.S.C. 154(b) by 740 days.

(21) Appl. No.: 10/068,677

(22) Filed: Feb. 6, 2002

Related U.S. Application Data

(60) Provisional application No. 60/345,415, filed on Dec. 31, 2001.

(51) Int. Cl.
*G06F 7/38* (2006.01)
(52) U.S. Cl. .................................. 708/491
(58) Field of Classification Search ........ 708/491–492; 380/28
See application file for complete search history.

(56) References Cited

U.S. PATENT DOCUMENTS

| | | | | |
|---|---|---|---|---|
| 6,209,016 | B1 * | 3/2001 | Hobson et al. ............. | 708/491 |
| 6,748,410 | B1 * | 6/2004 | Gressel et al. .............. | 708/491 |
| 2002/0194237 | A1 * | 12/2002 | Takahashi ................... | 708/491 |
| 2004/0054705 | A1 * | 3/2004 | Le Quere ................... | 708/491 |

OTHER PUBLICATIONS

Blum, T. and Paar, C., "High Radix Montgomery Modular Exponentiation on Reconfigurable Hardware", ECE Department, Worcester Polytechnic Institute, pp. 1-13.

Blum, Thomas, "Modular Exponentiation on Reconfigurable Hardware", Thesis Submitted to the Faculty of Worcester Polytechnic Institute, Apr. 8, 1999, 113 pages.

Elbirt, AJ and Paar, C., "Towards an FPGA Architecture Optimized for Public-Key Algorithms", Presented at the SPIE;s Symposium on Voice, Video, and Comm., Sep. 20, 1999, pp. 1-10.

Kim, Chinuk, "VHDL Implementation of Systolic Modular Multiplications on RSA Cryptosystem", Thesis at The City College of the City University of New York, Jan. 2001, 43 pages.

Gutub, Adnan, "A Modulo Multiplication Hardware Design", Project Report at Oregon State University, Electrical & Computer Engineering Department, Winter 2000, 8 pages.

(Continued)

*Primary Examiner*—Tan V. Mai
(74) *Attorney, Agent, or Firm*—Blakely, Sokoloff, Taylor & Zafman LLP

(57) ABSTRACT

A method and apparatus for Montgomery multiplication comprising adding at least one multiplicand bit from a first multiplicand add multiplexer in a main array of a Montgomery multiplier with at least one modulus bit from a first modulus-add multiplexer in the main array; adding at least one modulus bit from a first modulus-add multiplexer in a quotient pre-calculation array with at least one modulus bit from a second modulus-add multiplexer in the quotient pre-calculation array; pre-calculating the quotient during a first cycle; and sending at least one value to control the first modulus-add multiplexer in the main array, the first modulus-add multiplexer in the quotient pre-calculation array, and the second modulus-add multiplexer in the quotient pre-calculation array so that the value of the quotient is evenly divisible by the radix during a second cycle through the Montgomery multiplier.

22 Claims, 6 Drawing Sheets

OTHER PUBLICATIONS

Poldre, J. et al., "Modular Exponent realization on FPGAs", Tallinn Technical University, Computer Engineering Depatrment, 12 pages.

Savas, E. et al., "A Scalable and Unified Multiplier Architecture for Finite Fields GF(p) and GF(2m)", Oregon State University, Electrical and Computer Engineering, 20 pages.

Shand, M. et al., "Fast Implementation of RSA Cryptography", Digital Equipment Corp., Paris Research Laboratory, 9 pages.

Tenca, Alexandre F. and Koc, Cetin K., "A Scalable Architecture For Montgomery Multiplication", Oregon State University, Electrical and Computer Engineering Department, 13 pages.

"How SSL Works", http://developer.netscape.com/tech/security/ssl/howitworks.html, Jun. 1, 2001.

Savolainen, Sampo, "Internet Key Exchange (IKE)", Helsinki University of Technology, Department of Electrical and Communications Engineering, Nov. 22, 1999, http://www.niksula.cs.hut.fi/sjsavola/SoN/essay.html, 12 pages.

Internet Key Exchange Security Protocol, http://www.cisco.com/univercd/cc/td/doc/product/software/ios113ed/113t/113t_3/isakmp.htm,. Jun. 1, 2001, 45 pages.

Internet Key Exchange Security Protocol, http://www.cisco.com/univercd/cc/td/doc/product/software/ios113ed/113t/113t_3/isakmp.htm, Feb. 6, 2002.

* cited by examiner

METHOD AND APPARATUS FOR MONTGOMERY MULTIPLICATION

CROSS-REFERENCE TO RELATED APPLICATION

This application claims the benefit of priority from U.S. Provisional Application Ser. No. 60/345,415, filed Dec. 31, 2001.

BACKGROUND

1. Field of the Invention

The present invention is related to the field of hardware multiplication circuits. In particular, the present invention is related to an apparatus for performing Montgomery multiplication.

2. Description of the Related Art

Modular arithmetic, especially modular exponentiation is an integral part of cryptographic algorithms. In order to achieve optimal system performance while at the same time maintaining system security, modular exponentiation is often implemented in hardware. Traditional modular exponentiation relies on repeated modular multiplication. Montgomery multiplication is used to implement modular exponentiation because it is often more easily implemented in hardware.

pseudocode for a Montgomery multiplier of radix 2 is as follows:

P=0;

For i=0 to N−1

```
{   If mplier [i] = = 1
        P = P + mpcand      [1]
    If P is odd
        P = P − modulus     [2]
                            [3]
    P = P/2                 [4]
}
```

In the Montgomery multiplier pseudocode, [1] is referred to as the multiplicand add and is referred to as the modulus-add. As illustrated in [2] in the pseudocode, the test for implementing the modulus-add is whether the partial remainder P is odd. However, this is only true for a Montgomery multiplier of radix 2.

For higher order radices the Montgomery multiplier pseudocode has to be modified. For example, for a Montgomery multiplier of radix 4, at [2] an integral number of the modulus may have to be added or subtracted such that, after the addition or subtraction the partial remainder P must be evenly divisible by the radix. Also, [4] has to be modified such that the partial remainder P is divided by the radix. In addition, the for-loop is modified to account for the higher order radix.

Implementing the Montgomery multiplier in hardware implies that the redundant form of values can be used so that add/subtract operations can be performed in constant time. For a Montgomery multiplier of radix 2, the test to determine whether the partial remainder P is odd is easily implemented in hardware (e.g., using one or more exclusive-OR gates).

Montgomery multiplication introduces an additional term (i.e., a radix r, where $r=2^n$) in the multiplication such that, $2^n > M$ where M in cryptography is a key. In addition, at the start of a modular exponentiation, a modular multiplication (i.e., $r^2$ mod M) is performed. However, in cryptography, the result of this modular multiplication only changes when the key M is changed, whereas many Montgomery multiplications will be performed for a given value of M. Therefore, the system resources expended in performing the modular multiplication $r^2$ mod M are negligible.

FIG. 1 illustrates a block diagram of a prior art embodiment of a Montgomery multiplier. As FIG. 1 illustrates, the Montgomery multiplier 100 comprises a first set of one or more multiplexers 105A–N. A multiplier bit 127 controls each multiplexer 105A–N, such that, when the multiplier is 0, a 0 is output from the multiplexer; and when the multiplier bit is a 1, a multiplicand bit is output. Therefore, each of the multiplexers 105A–N has at its inputs a 0 bit and a different multiplicand bit. For the embodiment of FIG. 1, each multiplexer 105A–N is effectively an AND gate.

Each multiplexer 105A–N has its output coupled to one input of a corresponding CSA in a first set of one or more carry save adders (CSAs) 110A–N. Each CSA has three inputs and two outputs. The other two inputs of each CSA in the first set of CSAs 110A–N are selectively coupled to the outputs of a set of flip-flops 125A–M. Thus, for each intermediate cycle through the Montgomery multiplier, the partial remainder present at the output of the flip-flops 125A–M are recirculated back into CSAs 110A–N respectively. The multiplexers 105A–N and the CSAs 110A–N implement the multiplicand add [1] of the Montgomery multiplier pseudocode.

The two outputs of each CSA 110A–N comprise a sum output and a carry output. The sum output of each CSA in the first set of CSAs 110 A–N is coupled to an input of a corresponding CSA in a second set of one or more CSAs 120A–N. The carry output of each CSA in the first set of CSAs 110A–N (with the exception of 110A) is coupled to the other input of a different CSA in the second set of CSAs 120A–N, that is to the immediate left of the CSA to which the sum output is connected. Thus, the sum output of CSA 110B is connected to one input of CSA 120B, and the carry output of CSA 110B is connected to one input of CSA 120A.

A second set of one or more multiplexers 115A–N are coupled to the input of a corresponding CSA in the second set of CSAs 120A–N. Each multiplexer in the second set of multiplexers 115A–N is controlled by a quotient decision circuit 150. The quotient decision circuit inspects the partial remainder output from the rightmost CSA, (e.g., CSA 110N) and determines whether the partial remainder of the quotient is odd as illustrated in [2] of the Montgomery multiplier pseudocode. If the partial remainder of the quotient is odd, a corresponding modulus bit is added to the outputs from the first set of CSAs 110A–N. Otherwise, a 0 bit is added to the outputs from the first set of CSAs. Thus, each multiplexer in the second set of multiplexers 115A–N has either a 0 bit or a different modulus bit at each of its inputs, and inputs a bit to the corresponding CSA in the second set of CSAs 120A–N depending on the output from the quotient decision circuit 150. Thus, the quotient decision circuit 150 determines the value of the quotient for the current cycle through the Montgomery multiplier. The second set of multiplexers 115A–N along with the second set of CSAs 120A–N perform the modulus-add [3] illustrated in the Montgomery multiplier pseudocode.

The sum and carry outputs from the second set of CSAs 120A–N are shifted right one bit and selectively re-circulated (i.e., to implement the loop) into inputs of the first set of CSAs 110A–110N via a set of flip-flops 125A–M. For example, the sum output of CSA 120A is selectively coupled into CSA 110B via a flip-flop in the set of flip-flops 125A–M; while, the carry output from CSA 120B is coupled to CSA 110B. Shifting of the output of each CSA 120A–N by one bit corresponds to the division of the partial remainder (i.e., the value present at the sum output of the CSAs 120A–N) by 2 as illustrated in [4] of the pseudocode. The sum output of the rightmost CSA 120N, in the second set of CSAs, is guaranteed to be '0' by the quotient decision circuit 150 and is therefore ignored. Since the result of the Montgomery multiplier 100 is in redundant form, the result of the Montgomery multiplication is the sum of two vectors. In particular, the result of the Montgomery multiplication is the sum of the vector represented by the binary bits at the sum output of CSAs 120A–N (the sum vector), and the binary bits at the carry output of CSAs 120A–N (the carry vector). As will be further described later herein, the Montgomery multiplier of FIG. 1 contains one stage that processes one multiplier bit per cycle. Since this one stage processes one multiplier bit per cycle, the Montgomery multiplier of FIG. 1 processes one multiplier bit per cycle.

FIG. 5 illustrates a block diagram of a prior art embodiment of a Montgomery multiplier having two stages that each use booth recoding of radix 4. As illustrated in FIG. 5, the Montgomery multiplier 500 comprises two stages (i.e., stage 582 and stage 583). Stage 582 comprises a first set of one or more multiplexers 506A–N (i.e., multiplicand-add multiplexers). Multiplier bits 571 control each multiplexer 506A–N. Each multiplexer 506A–N has the following inputs: −2× the multiplicand, −1× the multiplicand, 0, 1× the multiplicand and 2× the multiplicand.

Each multiplexer 506A–N has its output coupled to one input of a corresponding CSA in a first set of one or more carry save adders (CSAs) 507A–N. Each CSA has three inputs and two outputs. The other two inputs of each CSA in the first set of CSAs 507A–N are selectively coupled to the outputs of a set of flip-flops 516A–M. Thus, for each intermediate cycle through the Montgomery multiplier, the partial remainder present at the output of the flip-flops 515A–M are recirculated back into CSAs 507A–N. The multiplexers 506A–N and the CSAs 507A–N implement the multiplicand add of the Montgomery multiplier (similar to the multiplicand add of pseudocode [1], except that more bits are being processed because this stage of the Montgomery multiplier of FIG. 5 employs booth recoding).

The two outputs of each CSA 507A–N comprise a sum output and a carry output. The sum output of each CSA in the first set of CSAs 507 A–N is coupled to an input of a corresponding CSA in a second set of one or more CSAs 509A–N. The carry output of each CSA in the first set of CSAs 507A–N is coupled to the other input of a different CSA in the second set of CSAs 509A–N, that is to the immediate left of the CSA to which the sum output is connected. Thus, the sum output of CSA 507A is connected to one input of CSA 509A, and the carry output of CSA 507A is connected to one input of CSA 509B.

A second set of one or more multiplexers 511A–N (i.e., modulus-add multiplexers) are coupled to the input of a corresponding CSA in the second set of CSAs 509A–N. Each multiplexer in the second set of multiplexers 511A–N is controlled by a quotient decision circuit 535. The quotient decision circuit inspects the sum and carry outputs from CSAs 507A, the sum output of CSA 507B as well as the values of modulus bits 0 and 1 (modulus bit 0 is always a '1'), and determines what integer multiple of the modulus must be added to make the partial remainder of the quotient evenly divisible by the radix. One skilled in the art will appreciate that when booth recoding of radix 4 is employed each modulus-add multiplexer has values of 0, 2× modulus, −1× modulus, and 1× the modulus value present at its inputs. Alternatively, each modulus-add multiplexer has values of 0, −2× modulus, −1× modulus, and 1× the modulus value present at its inputs. Thus, each multiplexer in the second set of multiplexers 511A–N inputs a bit to the corresponding CSA in the second set of CSAs 511A–N depending on the output from the quotient decision circuit 535. Thus, the quotient decision circuit 535 determines the value of the quotient for the current cycle through the Montgomery multiplier. The second set of multiplexers 511A–N along with the second set of CSAs 509A–N perform the modulus-add illustrated in the Montgomery multiplier pseudocode (similar to the modulus add of pseudocode [3], except that more bits are being processed because this stage of the Montgomery multiplier of FIG. 5 employs booth recoding).

As illustrated in FIG. 5, stage 582 of the Montgomery multiplier is duplicated to form second stage 583. The output from stage 582 is input into stage 583 as follows: The sum and carry outputs from CSAs 509B–N are shifted right two bit positions and input into CSAs 513A–N respectively. One skilled in the art will appreciate that the sum outputs from the first stage (i.e., from CSAs 509A–N are right shifted two bit positions and input into CSAs 513A–N because booth recoding of radix 4). Due to the shift, three bits (i.e., the sum and carry outputs of CSA 509A, and the sum output of CSA 509B) are shifted off the right edge of the multiplier circuit and are ignored. The right shifting of the output of each CSA 509A–N two bit positions is equivalent to dividing the partial remainder of the Montgomery multiplier by 4.

The output from stage 583 is selectively fed back into stage 582 via flip-flops 515A–M. In particular, the sum and carry outputs from the second set of CSAs 514B–N in stage 583 are shifted right two bit positions and selectively re-circulated (i.e., to implement a loop) into inputs of the first set of CSAs 507A–N via a set of flip-flops 515A–M. Due to the shift, three bits (i.e., the sum and carry outputs of CSA 514A, and the sum output of CSA 514B) are shifted off the right edge of the multiplier circuit and are ignored. Thus, the carry output of CSA 514A along with the sum and carry outputs from CSAs 514B–N are selectively re-circulated to CSAs 507 A–N. Shifting of the output of each CSA 514A–N by two bit positions corresponds to the division of the partial remainder by 4.

Since the result of the Montgomery multiplier 500 is in redundant form, the result of the Montgomery multiplication is the sum of two vectors. In particular, the result of the Montgomery multiplication is the sum of the vector represented by the binary bits at the sum output of CSAs 514A–N (the sum vector), and the binary bits at the carry output of CSAs 514A–N (the carry vector).

In the example of FIG. 5, each cycle through the Montgomery multiplier processes 4 multiplier bits (i.e., each of the two stages processes two bits). Therefore, one skilled in the art will appreciate that the number of bits processed per cycle depends on the number of stages in the Montgomery multiplier, and the number of bits processed per stage.

The determination of what integer multiple of the modulus must be added to make the partial remainder of the quotient evenly divisible by the radix is time consuming, and requires at least a few gate delays. Moreover, broadcasting the decision from the quotient decision circuit to control the multiplexers in the second set of multiplexers, and the subsequent calculation of the modulus-add result increases the time needed to calculate the result of the Montgomery multiplication. This is especially true in the case wherein booth recoding is employed and multiple multiplier bits are processed during each cycle through the Montgomery multiplier.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

Described are hardware implementations of a Montgomery multiplier. In particular, the Montgomery multiplier determines what integer multiple of the modulus must be added to make the partial remainder of the quotient evenly divisible by the radix. The quotient decision is broadcast at least one cycle ahead of each partial remainder calculation so that the delays associated with calculating the modulus-add, and hence the delay associated with calculating the result of the Montgomery multiplication is minimized. In certain embodiments, the Montgomery multiplier incorporates booth recoding and/or multiple stages to process more than one multiplier bit for each cycle through the Montgomery multiplier.

In the following description numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid obscuring the present invention.

In addition, it should be understood that the embodiments described herein are not related or limited to any particular hardware technology. Rather, the embodiments described may be constructed using various technologies (e.g., bipolar technology, complementary-metal-oxide-semiconductors (cmos) technology, etc.) in accordance with the teachings described herein. Similarly, it may prove advantageous to construct a specialized apparatus to perform the teachings described herein by way of discrete components, or by way of an integrated circuit that uses one or more integrated circuit die that may be interconnected. Lastly, repeated usage of the phrase "in one embodiment" does not necessarily refer to the same embodiment, although it may.

Figure 1:
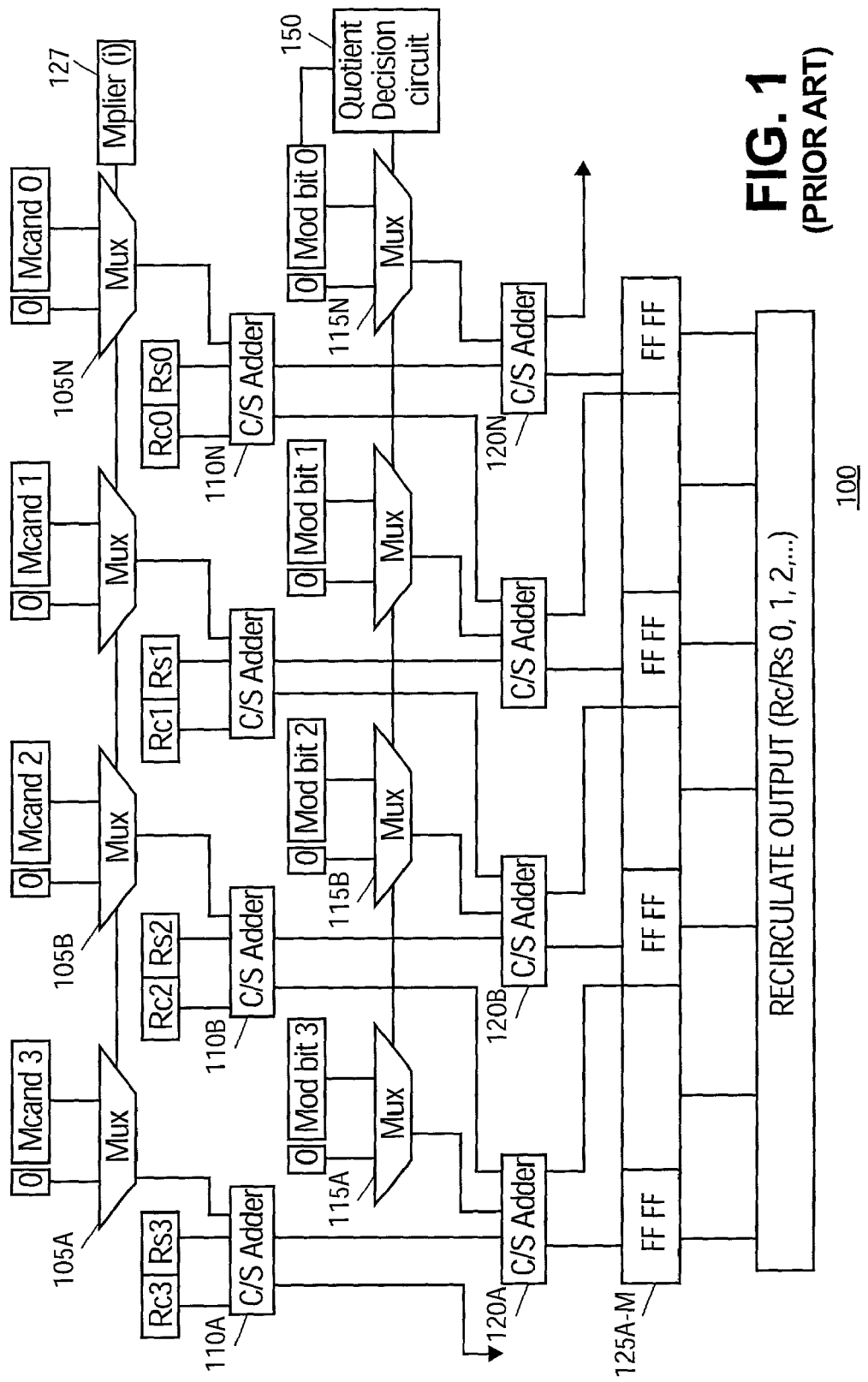
FIG. 1 illustrates a block diagram of a prior art embodiment of a Montgomery multiplier.
Figure 2:
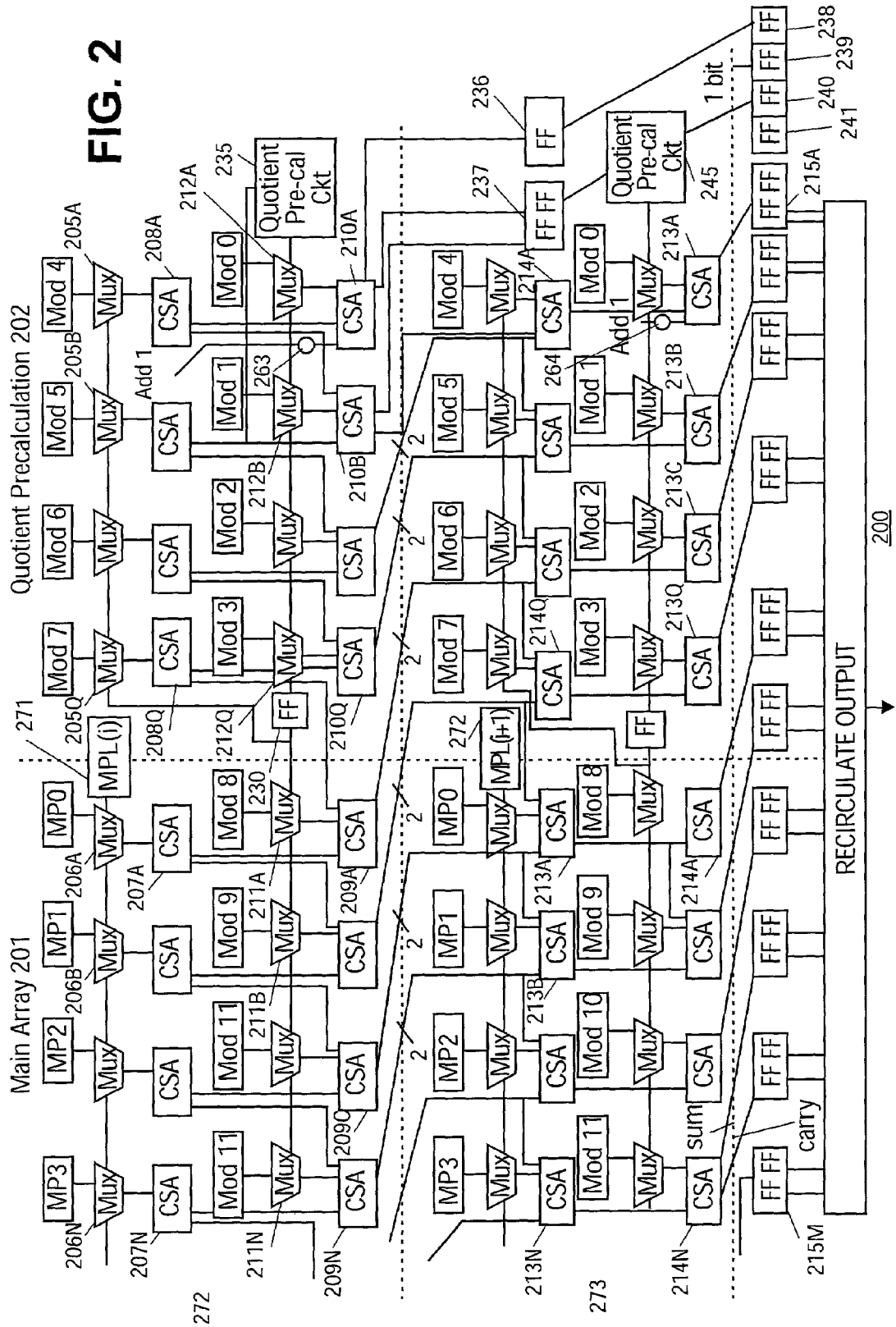
FIG. 2 illustrates a block diagram of a Montgomery multiplier having two stages that each use booth recoding of radix 4 according to one embodiment of the invention.

FIG. 2 illustrates a block diagram of a Montgomery multiplier having two stages that each use booth recoding of radix 4 according to one embodiment of the invention. Although the Montgomery multiplier, 200, illustrates processing 4 multiplier bits per cycle, one skilled in the art will appreciate that by modifying the circuitry the Montgomery multiplier may process any number of multiplier bits per cycle (i.e., The number of multiplier bits processed per cycle=Σ number of multiplier bits processed per stage). The Montgomery multiplier 200 illustrated in FIG. 2 comprises two stages (i.e., stage 272 and stage 273 respectively). Each stage of the Montgomery multiplier processes 2 bits per cycle. Thus, each stage of the Montgomery multiplier performs booth recoding of radix 4.

As illustrated in FIG. 2, each stage of the Montgomery multiplier comprises two arrays, a main array 201, and a quotient pre-calculation array 202. By partitioning the Montgomery multiplier into a main array and a quotient pre-calculation array, the Montgomery multiplier can be optimized; the main array is optimized for space whereas the quotient pre-calculation array is optimized for speed. In one embodiment, the quotient pre-calculation array processes at least Q bits of a Montgomery multiplication, where Q is the number of bits needed to predict whether the partial remainder of the quotient for the next cycle through the Montgomery multiplier is evenly divisible by the radix. It should also be noted that Q is also the number of multiplier bits processed per cycle; thus Q=4 in FIG. 2. Since the quotient pre-calculation array 202 processes Q bits, the number of columns in the Montgomery multiplier of FIG. 2 must be at least N+Q bits, where N is the number of bits needed to obtain the result (in redundant form) of the Montgomery multiplication. This is different from the Montgomery multiplier of FIG. 5 wherein for N bits needed to obtain the result (in redundant form) the number of columns is N. Since the quotient pre-calculation array of the Montgomery multiplier of FIG. 2 processes Q bits, the main array processes N bits.

Each stage of a Montgomery multiplier comprises alternate rows of multiplexers and CSAs in both the main array 201 and in the quotient pre-calculation array 202. For the first stage (i.e., stage 272) both, the main array 201 and the quotient pre-calculation array 202 comprise a first row of multiplexers 206A–N, and 205A–Q respectively. Each multiplexer 206A–N in the first row of the main array 201 is controlled by at least one multiplier bit 271 and is called a multiplicand-add multiplexer, whereas, each multiplexer 205A–Q in the first row of the quotient pre-calculation array 202 is controlled by the quotient pre-calculation circuit 235 via a flip-flop 230, and is called a modulus-add multiplexer. Each multiplicand-add multiplexer 206A–N in the main array 201 has multiples of a multiplicand bit coupled to its input. Thus, multiplicand-add multiplexer 206A has multiples of multiplicand bit 0 coupled to its input, multiplicand-add multiplexer 206B has multiples of multiplicand bit 1 coupled to its input, and so on for N bits of the multiplicand. Details of the inputs to the multiplicand-add multiplexers are described later. Each modulus-add multiplexer 205A–Q in the first row of the quotient pre-calculation array 202 has multiples of a different modulus bit coupled to its input. Details of the inputs to the modulus-add multiplexer are described later.

In one embodiment, the quotient pre-calculation array processes Q bits of the Montgomery multiplication, thus, modulus-add multiplexer 205A has at least modulus bit position Q coupled to its input, modulus-add multiplexer 205B has at least modulus bit position Q+1 coupled to its input and so on for Q modulus bits. The output from each multiplexer in the first row of multiplexers is coupled into a corresponding CSA in a first row of CSAs. Thus, the output from each multiplicand-add multiplexer 206A–N in the main array 201 is coupled into a corresponding CSA in the first row of CSAs 207A–N, and the output from each multiplexer 205A–Q in the quotient pre-calculation array 202 is coupled into a corresponding CSA in the first row of CSAs 208A–Q. The multiplexers 206A–N and the corresponding CSAs 207A–N perform the multiplicand add operation illustrated in the Montgomery multiplier pseudocode.

The sum output from each CSA 207A–N in the main array 201 is coupled into a corresponding CSA in a second row of CSAs 209A–N. So also, the sum output from each CSA 208A–Q in the quotient pre-calculation array 202 is coupled into a corresponding CSA in the second row of CSAs 210A–Q. The carry output from each CSA in the first row of CSAs is coupled to a CSA in the second row of CSAs that is to the immediate left of the CSA that received the sum output from the CSA in the first row. Thus the carry output of CSA 208A is coupled to CSA 210B etc. An input of each CSA in the second row of CSAs is also coupled to a corresponding multiplexer in a second row of multiplexers. Thus, each CSA 209A–N, in the main array 201, is coupled to the output of a corresponding modulus-add multiplexer 211A–N in the main array, and each CSA 210A–Q, in the quotient pre-calculation array 202, is coupled to the output of a corresponding modulus-add multiplexer 212A–Q in the quotient pre-calculation array. Each modulus-add multiplexer 212A–Q in the second row of multiplexers in the quotient pre-calculation array has a multiple of a different modulus bit coupled to its input. Thus, modulus-add multiplexer 212A has multiple of modulus bit 0, modulus-add multiplexer 212B has multiple of modulus bit 1 and so on until modulus-add multiplexer 212Q has multiple of modulus bit Q-1 coupled to its input. So also, each modulus-add multiplexer 211A–N in the second row of multiplexers in the main array 201 has a multiple of a different modulus bit coupled to its input. Thus, modulus-add multiplexer 211A has a multiple of modulus bit 2Q coupled to its input, modulus-add multiplexer 211B has a multiple of modulus bit 2Q+1, and so on for N modulus bits.

Modulus-add multiplexers 212A–Q are directly controlled by quotient pre-calculation circuit 235, whereas modulus-add multiplexers 211A–N and modulus-add multiplexers 205A–Q are controlled by quotient pre-calculation circuit 235 via flip-flop 230. By controlling modulus-add multiplexers 211A–N and modulus-add multiplexers 205A–Q via a flip—flip, the output from the quotient pre-calculation circuit is input to these multiplexers on the next pass through the Montgomery multiplier (i.e., the control signal is delayed by one clock cycle). Quotient pre-calculation circuit 235 examines the sum and carry outputs from CSAs 208A and 208B respectively, as well as the value of modulus bits 0 and 1.

One skilled in the art will appreciate that this is true when a stage uses booth recoding of radix 4. For a stage having a radix of other than 4, the outputs of other CSAs and modulus bits are examined. For example, for a stage of booth recoding of radix 8, the sum and carry bits from CSAs 208A, 208B, and 208C, as well as modulus bits 0, 1, and 2 are examined.

For the second stage (i.e., stage 273), the outputs from the CSAs in the second row of CSAs (i.e., from the first stage 272) are coupled to the CSAs in the third row of CSAs. In particular, the second stage 273 of the Montgomery multiplier is a duplicate of first stage 271 with the exception that the output of the second stage is fed back into the first stage 272 via a row of flip-flops. Flip-flops 238–241, and flip-flops 215A–M comprise the row of flip-flops that re-circulate the Montgomery-multiplier bits from the second stage back into the first stage. The sum and carry outputs from each CSA in the second row of CSAs is coupled to the input of CSAs in a third row of CSAs but is shifted two bit positions to the right of the CSAs in the second row. Thus the sum output of CSA 209C is coupled to the input of CSA 213A; while the carry output of CSA 209C is coupled to the input of CSA 213B. The carry output from CSA 210B, and the carry and sum outputs from CSA 210A are ignored until the last cycle through the Montgomery multiplier because the quotient pre-calculation circuit ensures the sum of these outputs to be 0.

For a Montgomery multiplier using booth recoding of radix 4 per stage, the value of the quotient is chosen such that the true remainder is divisible by 4. The true remainder is defined as the sum of the carry and sum vectors present in flip-flops 215A–M and flip-flops 238–240. Each flip-flop 238–240 and 215A–M is actually a pair of flip-flops representing a bit position. Thus flip-flop 238 has one flip-flop to store a sum bit and another flip-flop to store a carry bit of that bit position. In order for the true remainder to be divisible by 4, the sum of the carry and sum vectors of the true remainder must be 0. This means that the sum of the bits shifted out of the Montgomery multiplier each cycle are 0 (i.e., the sum of the carry and sum bits from CSA 210A and the sum bit from CSA 210B are 0; so also, the sum of the carry and sum bits from CSA 213A and the sum bit from CSA 210B and 213B are 0). The bits shifted out of the Montgomery multiplier may introduce a carry into bit position 0. This carry is accounted for in the quotient pre-calculation circuit 235 by coupling the sum and carry bits of CSA 213B through an OR gate and introducing a carry into quotient pre-calculation circuit 235 if the output of the OR gate is 1. However, this adds another gate in the quotient pre-calculation circuit. The addition of the OR gate is undesirable since the quotient pre-calculation circuit is in the critical path of the Montgomery multiplier calculation. To account for the addition of a carry without the addition of the OR gate into the Montgomery multiplier's critical path, CSAs 213A–Q and 214A–N are initialized such that the sum output of each CSA is 1 and the carry output of each CSA is 0 except for the rightmost CSA (i.e., CSA 213A) which has a 1 at its carry output.

Alternately, CSAs 213A–Q and 214A–N may be initialized such that the carry output of each CSA is 1 and the sum output of each CSA is 0 except for CSA 213A which has a 1 at its sum output. Ignoring the carry, the sum of the carry and the sum vectors at the outputs of CSAs 213A–Q and CSA 214A–N are 0, and is equivalent to initializing CSAs 213A–Q and CSAs 214A–N with 0. This guarantees that a 1 is always shifted out from the rightmost CSA 213A. Thus, the addition of the OR gate in the quotient pre-calculation circuit is eliminated. After, the first cycle the 1 bit is shifted off the edge of the Montgomery multiplier, effectively initializing the Montgomery multiplier to 0, and ensuring a carry in for the remainder of the multiplication operation.

To account for the addition of 1 in the initializing of CSAs, (i.e., to account for a 1 being shifted out of the carry output of the rightmost CSAs) the flip-flop adjacent to flip-flop 238B is configured to have a 1 at its output. Thus a 1 is added when the final result of the Montgomery multiplier is computed (i.e., when the sum of the carry vector and the sum vector is obtained to compute the final result of the Montgomery multiplication).

The logic of the quotient decision circuit for a stage of the Montgomery multiplier that uses booth recoding of radix 4 will now be described. The inputs needed for the quotient decision circuit are the carry and sum outputs for CSA 208A, a logic high bit, the sum bit of CSA 208B, and Modulus bit 1.

Let S(B:A) and R(B:A) be two vectors, such that S is the sum vector representing the bits in position A and B, (For example, If the sum output of CSA 208A is a 0 and the sum output of CSA 208B is a 1 then S(1:0)=1,0) and R is the carry vector representing the bits in position A and B.

Let Temp(1:0) represent the least significant bits of the partial remainder prior to a modulus add.

Temp(1:0)=S(1:0)+R(1:0)+1,

If Temp(1:0)=0,0 (implying a partial remainder divisible by 4), then Quotient decision=add 0 (i.e., CSAs 209A–N, and CSAs 208A–Q add 0 to the corresponding values input from the first row of CSAs).

If Temp(1:0)=1,0 (implying the partial remainder is not divisible by 4), then

Quotient decision=add 2× modulus (i.e., CSAs 209A–N add 2 times the modulus to the corresponding values input from the first row of CSAs).

If Temp(1:0)=0,1 and modulus=(0,1), then
Quotient decision =−1× modulus
If Temp(1:0)=0,1 and modulus=(1,1), then
Quotient decision=1× modulus
If Temp(1:0)=1,1 and modulus=(0,1), then
Quotient decision=1× modulus
If Temp(1:0)=1,1 and modulus=(1,1), then
Quotient decision =−1× modulus In order to input the modulus values above, each input to a modulus-add multiplexer have as inputs 0, 2× modulus, −1× modulus, and 1× modulus. One skilled in the art will appreciate that values of −1 times the modulus are easily obtained by inverting the modulus bits at each bit position, and values of 2× modulus are obtained by shifting the modulus bits left 1 bit position.

Thus, the quotient pre-calculation circuit pre-calculates the quotient and sends the appropriate control signal to add an integral multiple of a modulus bit to the partial remainders of the CSAs, as illustrated above, such that after the modulus-add the true remainder is evenly divisible by 4.

Because the Montgomery multiplier, 200, illustrated in FIG. 2 processes four multiplier bits each cycle, two stages with four rows of CSAs are illustrated with each pair of rows of CSAs (i.e., each stage) processing two multiplier bits each cycle. The connections for the second set of multiplexers and CSAs (i.e., the third and fourth rows of multiplexers and CSAs) are similar to that illustrated above, except that the forth row of CSAs (213A–Q and 214A–N) have their sum and carry outputs shifted two bit positions to the right and are coupled to the first row of CSAs via flip-flops 215A–M. Thus, the carry output from CSA 213B and the sum output from CSA 213C, in the fourth row of CSAs are coupled to the input of CSA 208A, in the first row of CSAs, via flip-flops 215 A–M.

Figure 5:
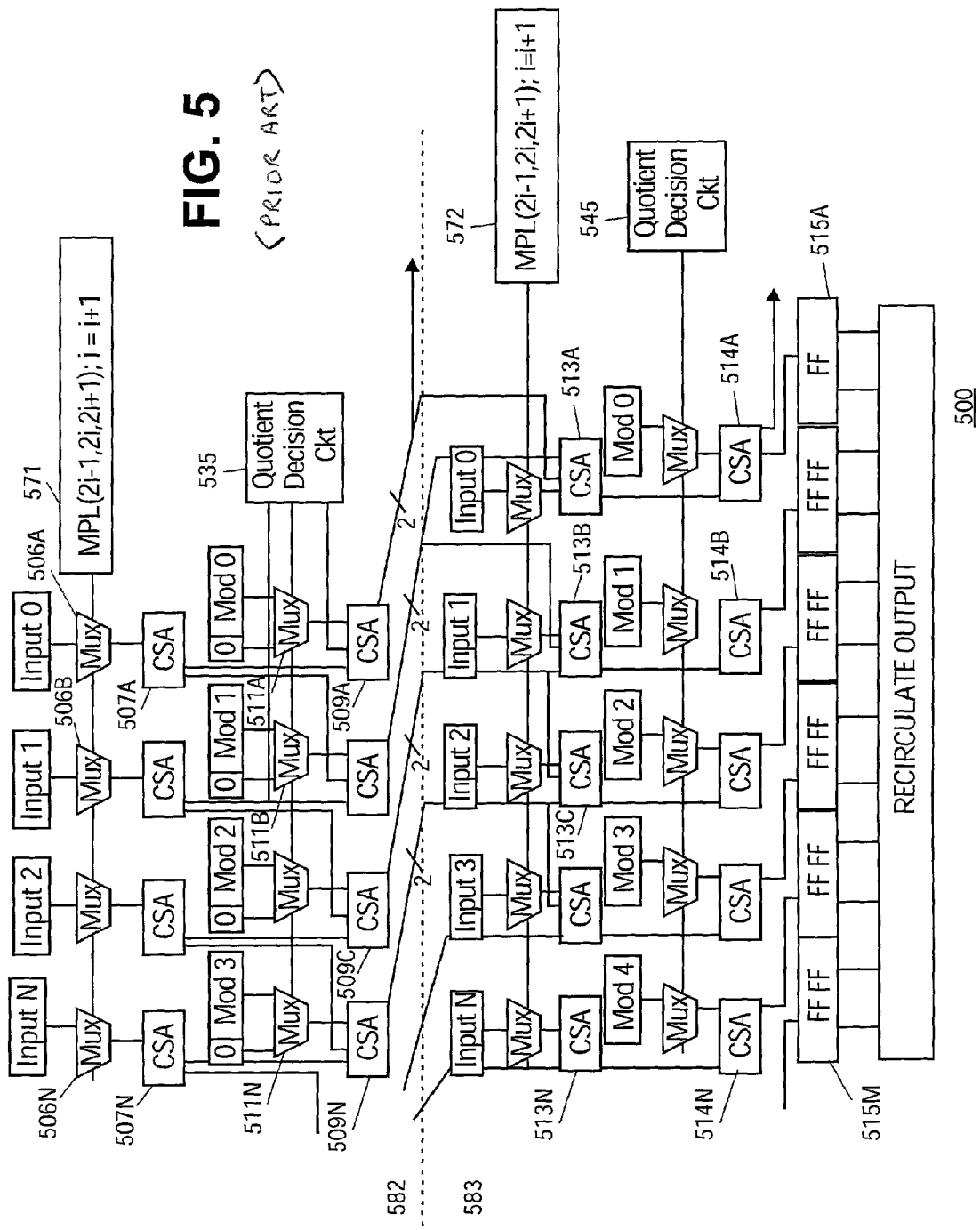
FIG. 5 illustrates a block diagram of a prior art embodiment of a Montgomery multiplier having two stages that each use booth recoding of radix 4.

For a given modular multiplication, the Montgomery multiplier of FIG. 5 performs X passes through the Montgomery multiplier; however, the Montgomery multiplier of FIG. 2 performs X+2 passes to perform the same modular multiplication. These two additional passes are referred to as the multiplicand modulus movement correction pass and the synchronization pass. Even though the Montgomery multiplier of FIG. 2 performs two extra passes through the Montgomery multiplier, the certain implementation has performance advantages because of: 1) the removal of the quotient calculation and broadcast from the critical path; and/or 2) the ability to optimize the main and quotient pre-calculation array as described. For example, where relatively large operands are being operated on (e.g., 1000 bits), the quotient calculation and broadcast is fairly time consuming; Thus, the removal of the quotient calculation and broadcast from the critical path, as well as the ability to optimize the circuitry, allows for improved performance.

The multiplicand/modulus movement correction pass is the first additional pass to be performed. The multiplicand/modulus movement correction pass is performed after processing all the multiplier bits of the Montgomery multiplication. Since the multiplicand bits are input into the Montgomery multiplier of FIG. 2 Q positions to the left, the modulus bits are shifted right Q bits and are distributed between the first set of CSAs and the second set of CSAs in a given stage as illustrated in FIG. 2, and the result of the Montgomery multiplication (in redundant form) is obtained Q bit positions to the right of where the multiplicand bits are input, the first additional pass through the Montgomery multiplier (i.e., the multiplicand/modulus movement correction pass) is performed with the multiplier bits as 0.

The multiplicand/modulus movement correction pass is followed by the synchronization pass. Since the quotient pre-calculation circuit 235 pre-calculates and determines what integer multiple of the modulus must be added to make the partial remainder of the quotient evenly divisible by the radix, the bits processed by the quotient pre-calculation array 202 and the bits processed by the main array 201 are out of sync by one cycle through the Montgomery multiplier. In particular, the bits processed by the quotient pre-calculation array are processed one cycle ahead of the bits in the main-array. In order to synchronize the bits in the main array and in the quotient pre-calculation array, the second additional pass (i.e., the synchronization pass) through the Montgomery multiplier 200 is performed. During the synchronization cycle the quotient pre-calculation circuit sends a signal to the multiplexers 212A–Q in the second row of multiplexers in the quotient pre-calculation array 202 to input a 0 to the partial remainders of the CSAs 210A–Q in the second row of CSAs in the quotient pre-calculation array. With a 0 input into CSAs 210A–Q, the data in both the main array and the quotient pre-calculation array are synchronized with each other at the end of the cycle through the Montgomery multiplier. However, synchronizing the Montgomery multiplier data in the main array and in the quotient pre-calculation array, during the synchronization cycle, may cause non-zero bits to be to be shifted out of the Montgomery multiplier. The non-zero bits are shifted out the second row of the rightmost CSAs (i.e., CSAs 210A, 213A etc.) in the quotient pre-calculation array because, during this synchronization cycle, the check to determine what integer multiple of the modulus must be added to make the partial remainder of the quotient evenly divisible by the radix is suspended. Therefore, buffers (e.g., flip-flops 236 and 237) are provided for each stage to capture the bits shifted out the rightmost CSAs in the Montgomery multiplier. The number of buffers needed to capture the bits shifted out each stage increase in a stair step pattern. Since the first stage shifts 2 bits out the right most CSA in the Montgomery multiplier, 2 buffers 236 and 237 are provided. The second stage shifts 2 more bits out the right most CSA in the Montgomery multiplier, and therefore 4 buffers 238, 239, 240, and 241 are needed, and so on depending on the number of stages and the number of bits processed per stage in the Montgomery multiplier.

When booth recoding is used in a given stage of the Montgomery multiplier, multiples of the multiplicand typically need to be calculated (e.g., when booth recoding of radix 4 is used, the values of 2× the multiplicand, −1× the multiplicand, 0, 1× the multiplicand and 2× the multiplicand). Such multiples can be generated a number of different ways. For example, in one embodiment separate circuitry is included to calculate the multiples and provide them as the inputs into the multiplicand-add multiplexers (e.g., when booth recoding of radix 4 is performed in each stage the inputs into the multiplicand-add multiplexers 206A–N are −2× the multiplicand, −1× the multiplicand, 0, 1× the multiplicand and 2× the multiplicand (see FIG. 3)). In contrast, certain embodiments provide different inputs into the multiplicand-add multiplexers and compensate using another mechanism. Examples of such mechanisms are described later herein with reference to FIGS. 4 and 6.

Figure 3:
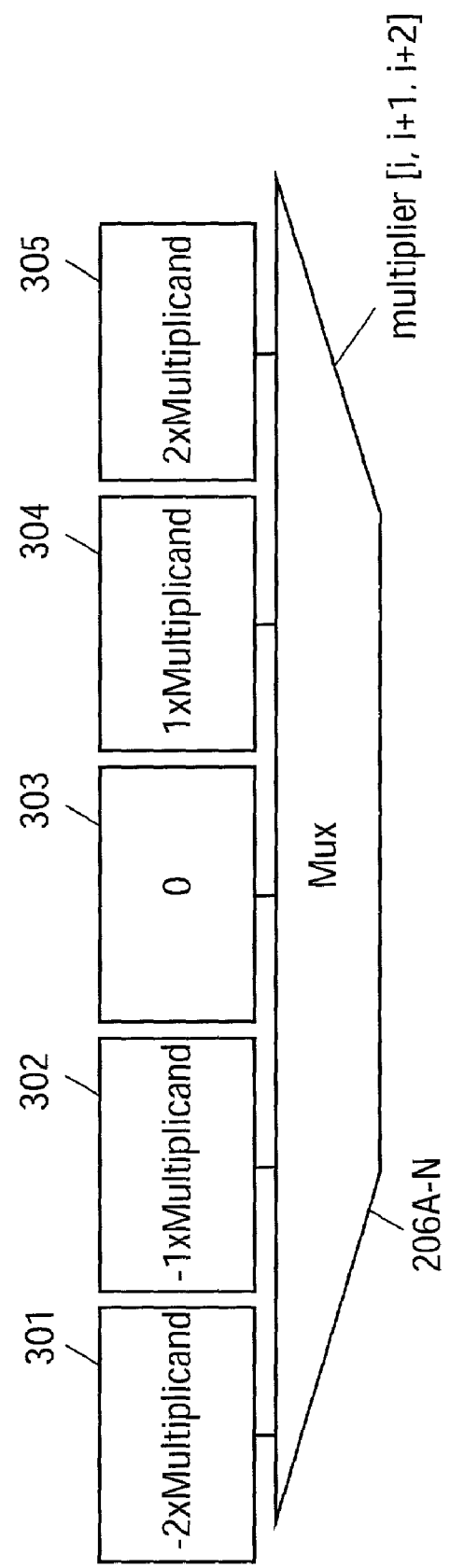
FIG. 3 illustrates the inputs to a multiplicand-add multiplexer of a Montgomery multiplier with booth recoding of radix 4 to implement a first technique according to one embodiment of the invention.

FIG. 3 illustrates the inputs to a multiplicand-add multiplexer of a Montgomery multiplier with booth recoding of radix 4 to implement a first technique according to one embodiment of the invention. As illustrated in FIG. 3, the inputs 301–305 to each multiplicand-add multiplexer 206A–N are −2× the multiplicand, −1× the multiplicand, zero, 1× the multiplicand, and 2× the multiplicand respectively. In particular, each CSA 207A–N, during a partial remainder calculation, will receive a bit corresponding to a multiple of the multiplicand depending on the radix of the booth recoding that is used. Each multiplicand-add multiplexer 206A–N is controlled by three multipier bits of the Montgomery multiplication when booth recoding of radix 4 is used for the stage.

Thus, the values input at multiplicand-add multiplexer inputs 301–305 are pre-computed (e.g., in hardware and/or software) and input into the multiplicand multiplexers 205A–N via flip-flops (not shown). The negative numbers are input at multiplexer inputs 301 and 302 (i.e., −2× the multiplicand and −1× the multiplicand) by obtaining the 2's complement of the multiplicand. In particular, in order to compute the value input at 302, (i.e., −1× the multiplicand) the multiplicand bits stored (e.g., in a buffer) are inverted using inverters (not shown), and a 1 is added to the inversion. In order to obtain the value input at 301 (i.e., −2× the multiplicand), the 2's complement of the multiplicand obtained above is shifted left one bit. After the left shift of the 2's complement of the multiplicand the least significant bit is initialized to 0. When the first technique is used, multiplexers 263 and 264 of stages 272 and 273 respectively input 0 to CSAs 210A and 213A.

Figure 6:
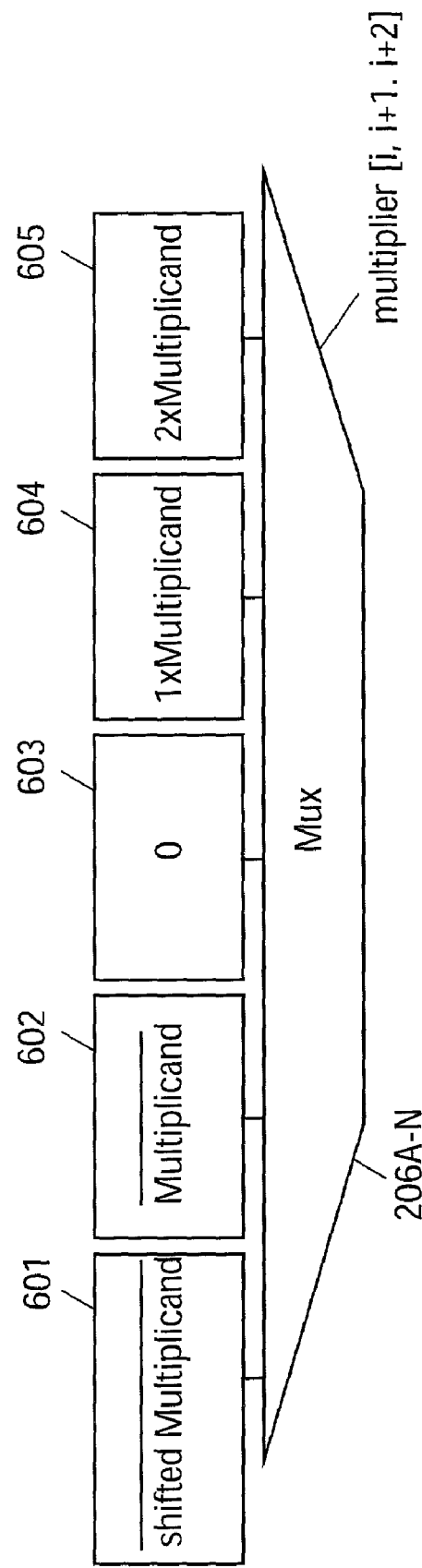
FIG. 6 illustrates the inputs to a multiplicand-add multiplexer of a Montgomery multiplier with booth recoding of radix 4 to implement a second technique according to one embodiment of the invention.

FIG. 6 illustrates the inputs to a multiplicand-add multiplexer of a Montgomery multiplier with booth recoding of radix 4 to implement a second technique according to embodiments of the invention. In the second technique, in order to obtain the 2's complement of the multiplicand, the multiplicand bits corresponding with inputs 601 and 602 are inverted using (e.g., inverters) and input into each of the multiplicand-add multiplexers 206A–N. The other inputs (i.e., inputs 603, 604, and 605) of multiplexers 206 A–N are 0, 1× multiplicand, and 2× multiplicand respectively. To complete the 2's complement of the multiplicand for multiplicand-add multiplexer inputs 601 and 602 that are output from the multiplicand-add multiplexers 206A–N to the corresponding CSAs, a '1' has to be added to the inverted multiplicand bits that are coupled into corresponding CSAs from multiplicand-add multiplexers 206A–N. As previously indicated, different compensation mechanisms can be used. In one embodiment, the compensation mechanism is the selective addition of a 1 using the unused input of CSA 210A, and 213A as shown in FIG. 2 (i.e., using multiplexer 263 for stage 272, and multiplexer 264 for stage 273). Thus, if during a cycle through the Montgomery multiplier an inverted multiplicand bit is added to the partial remainder, for example, at CSA 207A from multiplexer 206A, during the next cycle through the Montgomery multiplier the 1 is added at CSA 210A to complete the 2's complement. Multiplexers 263 and 264 are controlled by a control circuit (not shown) such that, the 1 is added whenever it is necessary to complete the 2's complement of the multiplicand; otherwise a 0 is added to the partial remainders at the corresponding inputs of CSAs 210A and 213A.

In an alternative embodiment, the compensation mechanism is provided by modifying the Montgomery multiplier illustrated in FIG. 2 to include an add-one array.

Figure 4:
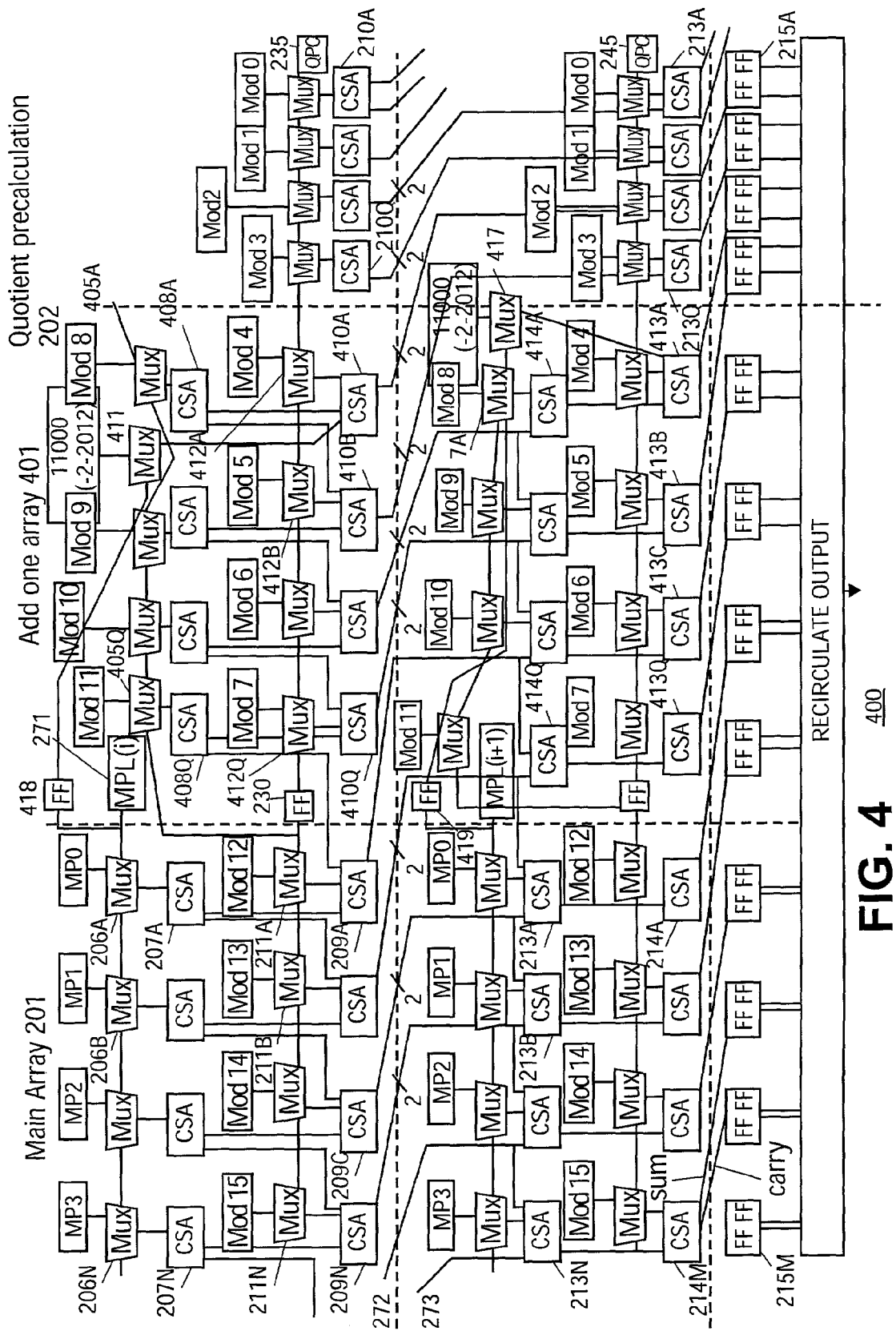
FIG. 4 illustrates a Montgomery multiplier with an add-one array according to one embodiment of the invention.

FIG. 4 illustrates one embodiment a Montgomery multiplier with an add-one array. As the Montgomery multiplier, 400, of FIG. 4 illustrates, the add-one array 401 comprises alternate rows of add-one multiplexers and CSAs disposed between corresponding rows of multiplexers and CSAs in the main array and in the quotient pre-calculation array of the Montgomery multiplier of FIG. 2. In addition, Montgomery multiplier 400 illustrates a buffer section (not shown) that stores bits shifted out of the rightmost CSAs as described earlier. The add-one array 401 is similar to main array 201 except that inputs into add-one multiplexer 411 of the add-one array 401 in stage 272 is 1, 1, 0, 0, and 0. So also, the input into the corresponding multiplexer 417 in stage 273 is 1, 1, 0, 0, and 0. As illustrated in FIG. 4, a multiplier bit via a flip-flop controls each add-one multiplexer (i.e., flip-flops 418 and 419 corresponding with stages 272 and 273 control add-one multiplexers 411 and 417 respectively). The flip-flops latch a multiplier bit to control the add-one multiplexers in the add-one array, such that, a '1' is added to the corresponding partial remainders from CSAs in the main array to complete the 2s complement. Thus, for a Montgomery multiplier of radix 4, if multiplicand add multiplexer 206A inputs an inverted multiplicand bit from multiplexer inputs 601 or 602 of FIG. 6 into CSA 207A, after the first pass through the Montgomery multiplier, the partial remainder has a '1' added at add-one multiplexer 405A to complete the 2's complement during the next cycle. Thus, the Montgomery multiplier 400 illustrates a Montgomery multiplier of radix 4 that includes an add-one array that completes the 2's complement of inverted multiplicand bits input into the main array. When the add one array is used, multiplexers 263 and 264 of stages 272 and 273 respectively input 0 to CSAs 210A and 213A.

As illustrated in FIG. 4, flip-flop 418 receives its input from multiplexer control 271. The output from flip-flop 418 controls multiplexer 411, thereby adding the '1' to the corresponding partial remainder in the add-one array 401. The outputs from CSAs 210A and the sum output from CSA 210B of stage 272 is connected to flip-flops as illustrated in FIG. 2. So also, the outputs from CSAs 213A and 213B of stage 273 are connected to flip-flops (not shown).

In a Montgomery multiplier with an add-one array, a row of multiplexers and CSAs in the quotient pre-calculation array for stage 272 and stage 273 is omitted. Thus, the quotient pre-calculation array 202 of stage 272 has only one row of multiplexers and CSAs; so also stage 273 has only one row of multiplexers and CSAs. The row of multiplexers in stage 272 of the quotient pre-calculation array 202 are controlled by quotient pre-calculation circuit 235, and the row of multiplexers in stage 273 are controlled by quotient pre-calculation circuit 245.

As illustrated in FIG. 4, the sum outputs from each CSA in the second row of CSAs in a given stage (i.e., for the main array and the add one array) is shifted right two bit positions to the right of the CSAs in the second row of CSAs and input into corresponding CSAs in the third row of CSAs (i.e., into the CSA in the next stage). Thus, the sum output of CSA 209N is input into CSA 213B. The carry output from each CSA in the second row of CSAs in a given stage (i.e., for the main array and the add one array) is shifted right one bit position to the right of the CSAS in the second row of CSAs and input into corresponding CSAs in the third row of CSAs. Thus, the carry output of CSA 209N is input into CSA 213C.

For the quotient pre-calculation array, the sum and carry output from CSA 210A and the sum output from CSA 210B is shifted right into flip-flops (not shown). The sum outputs for the remaining CSAs are shifted right 2 bit positions and input into a corresponding CSA in the next stage of the quotient pre-calculation array. Thus, the sum output from CSA 210C is input into CSA 213A, and the carry output from CSA 210C is input into CSA 213B.

The outputs from the CSAs in the last stage e.g., stage 273 are shifted right 2 bit positions and input into flip-flops e.g., flip-flops 215 A–M, and the output from flip-flops are re-circulated from the second stage 273 of the Montgomery multiplier back into the first stage.

While embodiments have been described with two stages that each use booth recoding of radix 4, alternative embodiment of the invention have more/less stages and/or booth recoding of a different radix (or not booth recoding) on all or different stages. For example, one embodiment has two stages, where one stage uses booth recoding of radix 4 and the other stage does not use booth recoding. As another example, one embodiment includes 3 stages that all use booth recoding of radix 4.

Thus a method and apparatus have been disclosed for a Montgomery multiplier. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An apparatus comprising:
   a quotient pre-calculation array (QPA);
   a main array; and
   a quotient pre-calculation circuit, to ensure a true remainder during a following cycle is evenly divisible by a radix.

2. The apparatus of claim 1 wherein the main array and the QPA comprises:
   a first multiplicand-add multiplexer (MAM) in the main array to couple at least a multiplicand bit with a first carry save adder (CSA) in the main array;
   a first modulus-add multiplexer (MM) in the QPA to couple at least a modulus bit with a first CSA in the QPA;
   a second CSA in the main array coupled with the first CSA in the main array and with a first MM in the main array; and
   a second CSA in the QPA coupled with the first CSA in the QPA, and with a second MM in the QPA.

3. The apparatus of claim 2, wherein the quotient pre-calculation circuit is coupled with the second MM in the QPA, the second MM in the main array, and with the first MM in the QPA.

4. An apparatus as in claim 2 wherein the CSAs have three inputs, a sum output and a carry output.

5. An apparatus as in claim 2 wherein the second CSA in the main array is further coupled to the first CSA in the QPA through a flip-flop.

6. An apparatus as in claim 2, wherein the second CSA in the QPA is coupled to a buffer.

7. An apparatus as in claim 2, wherein the MAM is coupled to at least one multiplier bit.

8. An apparatus as in claim 2 wherein, the second MM in the main array and the first MM in the QPA are coupled to the quotient pre-calculation array via a flip-flop.

9. An apparatus as in claim 2, wherein the QPA processes Q bits of a Montgomery multiplication, and the main array processes N–Q bits of the Montgomery multiplication.

10. An apparatus as in claim 9 wherein the main array is Q bits to the left of the quotient pre-calculation array.

11. An apparatus as in claim 1, wherein the main array is optimized for area, and the quotient pre-calculation array is optimized for speed.

12. An apparatus comprising:
    a quotient pre-calculation array (QPA), an add-one array, and a main array comprising
    a first multiplicand-add multiplexer (MAM) in the main array to couple at least a multiplicand bit with a first carry save adder (CSA) in the main array;
    a first modulus-add multiplexer (MM) in the QPA to couple at least a modulus bit with a first CSA in the QPA;
    a first add-one multiplexer (AOM) in the add-one array to couple at least a binary one bit with a first CSA in the add-one array;
    a second CSA in the main array coupled with the first CSA in the main array and with a first MM in the main array;
    a second CSA in the QPA coupled with the first CSA in the QPA, and with a second MM in the QPA;
    a second CSA in the add-one array coupled with the first CSA in the add-one array, and with a first MM in the add-one array; and
    a quotient pre-calculation circuit, to pre-calculate a quotient, coupled with the second MM in the QPA, the second MM in the main array, and with the first MM in the QPA.

13. An apparatus as in claim 12, wherein the first add-one multiplexer is coupled to at least one multiplier bit via flip-flops.

14. An apparatus as in claim 12, wherein the second CSA in the main array is further coupled to the first CSA in the add-one array, and the second CSA in the add-one array is coupled to the first CSA in the QPA through one or more flip-flops.

15. A method comprising:
    adding at least one multiplicand bit from a first multiplicand-add multiplexer in a main array of a Montgomery multiplier with at least one modulus bit from a first modulus-add multiplexer in the main array;
    adding at least one modulus bit from a first modulus-add multiplexer in a quotient pre-calculation array with at least one modulus bit from a second modulus-add multiplexer in the quotient pre-calculation array;
    pre-calculating the quotient during a first cycle; and
    sending at least one value to control the first modulus-add multiplexer in the main array, the first modulus-add multiplexer in the quotient pre-calculation array, and the second modulus-add multiplexer in the quotient pre-calculation array so that the value of the quotient is evenly divisible by the radix during a second cycle through the Montgomery multiplier.

16. A method as in claim 15, further comprising performing an additional cycle through the Montgomery multiplier to synchronize the bits in the main array and in the quotient pre-calculation array.

17. A method as in claim 15, wherein during the additional cycle the second modulus-add multiplexer outputs a 0 bit.

18. A method as in claim 15 further comprising inserting a 1 bit when necessary to complete a 2's complement of the multiplicand.

19. A method as in claim 15 wherein the first multiplicand-add multiplexer has values at its inputs consisting at least one of −2× the multiplicand, −1× the multiplicand, 0, 1× the multiplicand, and 2× the multiplicand.

20. An apparatus comprising:
means for adding at least one multiplicand bit from a first multiplicand add multiplexer in a main array of a Montgomery multiplier with at least one modulus bit from a first modulus-add multiplexer in the main array;
means for adding at least one modulus bit from a first modulus-add multiplexer in a quotient pre-calculation array with at least one modulus bit from a second modulus-add multiplexer in the quotient pre-calculation array;
means for pre-calculating the quotient during a first cycle; and
means for sending at least one value to control the first modulus-add multiplexer in the main array, the first modulus-add multiplexer in the quotient pre-calculation array, and the second modulus-add multiplexer in the quotient pre-calculation array so that the value of the quotient is evenly divisible by the radix during a second cycle through the Montgomery multiplier.

21. An apparatus as in claim 20, further comprising means for performing an additional cycle through the Montgomery multiplier to synchronize the bits in the main array and in the quotient pre-calculation array.

22. An apparatus as in claim 20, wherein the means for pre-calculating the quotient causes the second modulus-add multiplexer to output a 0 bit during the additional cycle through the Montgomery multiplier.

* * * * *

UNITED STATES PATENT AND TRADEMARK OFFICE
CERTIFICATE OF CORRECTION

| | | |
|---|---|---|
| PATENT NO. | : 7,035,889 B1 | Page 1 of 1 |
| APPLICATION NO. | : 10/068677 | |
| DATED | : April 25, 2006 | |
| INVENTOR(S) | : David A. Carlson et al. | |

It is certified that error appears in the above-identified patent and that said Letters Patent is hereby corrected as shown below:

In the claims

Claim 1, Column 13, Lines 48-53, please delete "An apparatus comprising:

a quotient pre-calculation array (QPA);

a main array; and a quotient pre-calculation circuit, to ensure a true remainder during a following cycle is evenly divisible by a radix." and insert -- An apparatus comprising:

a Montgomery multiplier including, a quotient pre-calculation array (QPA), to participate in pre-calculation of a quotient;

a main array coupled to the QPA; and a quotient pre-calculation circuit coupled to the main array and the QPA, the quotient pre-calculation circuit to ensure a true remainder during a following cycle is evenly divisible by a radix. --

Signed and Sealed this
Tenth Day of November, 2015

Michelle K. Lee
*Director of the United States Patent and Trademark Office*